United States Patent
Huang

(10) Patent No.: US 8,144,110 B2
(45) Date of Patent: Mar. 27, 2012

(54) LIQUID CRYSTAL DISPLAY AND BACKLIGHT SYSTEM WITH DETECTION CIRCUIT FOR DETECTING CONNECTION STATE OF POWER INPUT

(75) Inventor: Shun-Ming Huang, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 903 days.

(21) Appl. No.: 12/154,759

(22) Filed: May 27, 2008

(65) Prior Publication Data

US 2008/0291154 A1  Nov. 27, 2008

(30) Foreign Application Priority Data

May 25, 2007  (CN) .......................... 2007 1 0074605

(51) Int. Cl.
  *G09G 3/36* (2006.01)
(52) U.S. Cl. ........................................ 345/102; 345/211
(58) Field of Classification Search .................. 345/102, 345/211
See application file for complete search history.

(56) References Cited

U.S. PATENT DOCUMENTS

| | | | |
|---|---|---|---|
| 5,886,880 A | 3/1999 | Hisanaga | |
| 2002/0021275 A1* | 2/2002 | Kataoka et al. | 345/102 |
| 2005/0242789 A1* | 11/2005 | Kang | 323/224 |
| 2006/0267922 A1* | 11/2006 | Kim | 345/102 |
| 2007/0126690 A1* | 6/2007 | Chae | 345/102 |
| 2007/0127177 A1* | 6/2007 | Benton et al. | 361/90 |
| 2007/0188112 A1* | 8/2007 | Kang et al. | 315/291 |

FOREIGN PATENT DOCUMENTS

| CN | 1776497 A | 5/2006 |
|---|---|---|
| CN | 1855207 A | 11/2006 |

* cited by examiner

*Primary Examiner* — Chanh Nguyen
*Assistant Examiner* — Long D Pham
(74) *Attorney, Agent, or Firm* — Altis Law Group, Inc.

(57) ABSTRACT

An exemplary backlight system includes a power input circuit (21), a detection circuit (27), a control circuit (28), a light emitting diode driving circuit (25), and a light emitting diode array (26). The detection circuit is configured to detect a connection state of the power input circuit with respect to an external power source, and send a corresponding connection states signal to the control circuit. The control circuit is configured to output a control signal to the light emitting diode driving circuit according to the connection state signal. The light emitting diode driving circuit is configured to drive or shut down the light emitting diode array according to the control signal.

14 Claims, 3 Drawing Sheets

LIQUID CRYSTAL DISPLAY AND BACKLIGHT SYSTEM WITH DETECTION CIRCUIT FOR DETECTING CONNECTION STATE OF POWER INPUT

FIELD OF THE INVENTION

The present invention relates to backlight systems and liquid crystal display devices, and particularly to a backlight system with a detection circuit and a liquid crystal display device using the backlight system.

BACKGROUND

A typical liquid crystal display (LCD) device has the advantages of portability, low power consumption, and low radiation, and has been widely used in various portable information products such as notebooks, personal digital assistants (PDAs), video cameras and the like. Furthermore, the LCD is considered by many to have the potential to completely replace CRT (cathode ray tube) monitors and televisions.

One kind of conventional LCD device includes an LCD panel, a backlight source for illuminating the LCD panel, and a power supply circuit for driving the LCD panel and the light source.

Referring to FIG. 3, this is a block diagram of a conventional LCD device. The LCD device 1 includes an alternating current (AC) filter circuit 11, a rectifier and voltage step-down circuit 12, an LCD panel 13, a scaler 14, an LED driving circuit 15, and an LED array 16.

The AC filter circuit 11 generally includes capacitors with large capacitance and windings with large inductance, in order to filter surge voltages from an external electrical network, and then output steady AC current to the rectifier and voltage step-down circuit 12. Then the AC current is rectified and reduced to variety of direct current (DC) voltages, such as 3 volts (V), 5V, 9V, and the like. The DC voltages are used for driving the LCD panel 13 and the scaler 14.

The scaler 14 receives video signals from an external device, processes the video signals, and then sends the video signals to the LCD panel 13 for display of corresponding images. At the same time, the scaler 14 outputs a pulse width modulation (PWM) signal to the LED driving circuit 15. The LED driving circuit 15 receives the PWM signal, and correspondingly drives the LED array 16 to emit light beams for illuminating the LCD panel 13.

The AC filter circuit 11 and the rectifier and voltage step-down circuit 12 both include large capacitors and large windings. In operation, electrical power is stored in the capacitors and the windings. However, when the AC power is cut off, electrical power stored in the capacitors and the windings is released. The released electrical power drives the LCD panel 13 and the LED array 16 to continue working for a moment after the AC power is cut off. Because the released power is abnormal and uncontrolled, colors displayed on the LCD panel 13 are correspondingly abnormal and uncontrolled. For example, so-called red and blue noise colors are displayed. The noise colors reduce a display quality and aesthetic appeal of the LCD device 1.

Accordingly, what is needed is an LCD device that can overcome the above-described deficiencies.

SUMMARY

In a first aspect, a backlight system includes a power input circuit a detection circuit, a control circuit, a light emitting diode driving circuit, and a light emitting diode array. The detection circuit is configured to detect a connection state of the power input circuit with respect to an external power source, and send a corresponding connection states signal to the control circuit. The control circuit is configured to output a control signal to the light emitting diode driving circuit according to the connection state signal. The light emitting diode driving circuit is configured to drive or shut down the light emitting diode array according to the control signal.

In a second aspect, a liquid crystal display device includes a power input circuit, a detection circuit, a control circuit, a light emitting diode driving circuit, a light emitting diode array, a scaler, and a liquid crystal display panel. The power input circuit is capable of receiving electrical power from an external power source and providing electrical power to the liquid crystal display panel and the scaler. The scaler is configured to provide video signals to the liquid crystal display panel. The detection circuit is configured to detect a connection state of the power input circuit with respect to an external power source, and send a corresponding connection state signal to the control circuit, the control circuit is configured to output a control signal to the light emitting diode driving circuit according to the connection state signal. The light emitting diode driving circuit is configured to switch driving of the light emitting diode array according to the control signal.

In a third aspect, a liquid crystal display device includes a power input circuit, a liquid crystal panel, a scaler configured for providing video signals to the liquid crystal display panel, and a backlight system configured for providing light beams for the liquid crystal display panel. the power input circuit is capable of receiving alternating current from an external power source and providing direct current to the liquid crystal display panel and the scaler, the backlight system is coupled to the power input circuit and is configured to detect a connection state of the power input circuit with respect to an external power source, and is further configured to provide or stop providing light beams to illuminate the liquid crystal display panel according to the connection state detected by the power input circuit.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
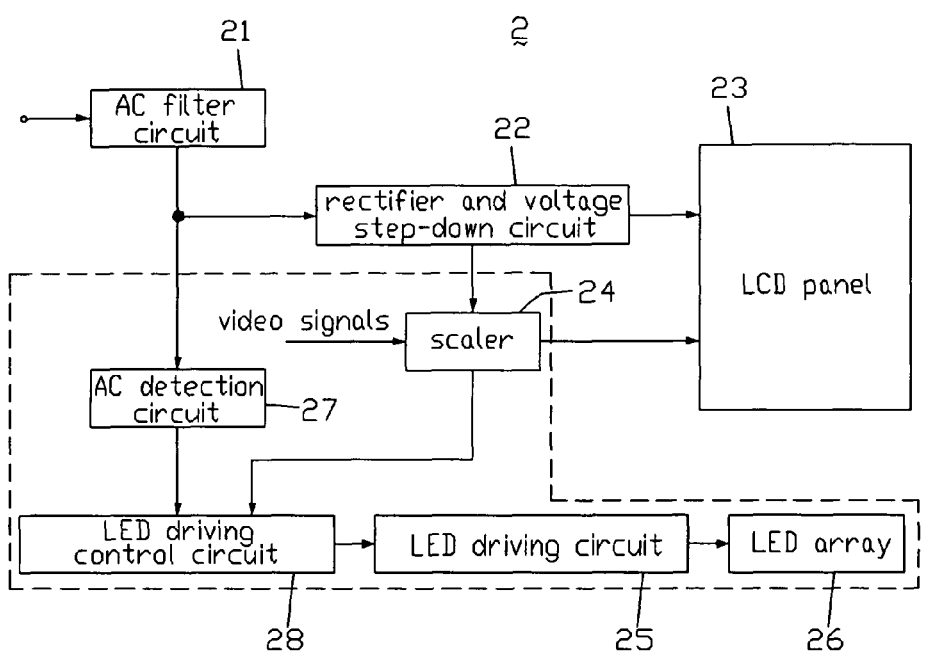
FIG. 1 is a block diagram of an LCD device according to a preferred embodiment of the present invention.

FIG. 1 is a block diagram of an LCD device according to a preferred embodiment of the present invention. The LCD device 2 includes an AC filter circuit 21, a rectifier and voltage step-down circuit 22, an LCD panel 23, a scaler 24, an AC detection circuit 27, an LED driving control circuit 28, an LED driving circuit 25, and an LED array 26.

The AC filter circuit 21 generally includes capacitors with large capacitance and windings with large inductance. The AC filter circuit 21 receives AC voltage from an external electrical network, and filters surge voltages and electromagnetic interference (EMI) of the external electrical network.

The LCD device 2 thereby complies with relevant Federal Communication Commission (FCC) standards, European Community (CE) standards, and the like. Then the AC filter circuit 21 outputs steady AC voltage to the rectifier and voltage step-down circuit 22.

The rectifier and voltage step-down circuit 22 generally includes a rectifier circuit (not shown) and a DC-DC voltage step-down circuit (not shown). The rectifier circuit transforms the AC voltage to a high DC voltage. The DC-DC voltage step-down circuit reduces the high DC voltage to a variety of low DC voltages, such as 3V (volts), 5V, 9V, 12V, and the like. Then the low DC voltages are supplied to the LCD panel 23 and the scaler 24.

The scaler 24 receives video signals such as low voltage differential signals (LVDS), processes the video signals, and sends the video signals to the LCD panel 23. At the same time, the scaler 24 outputs a PWM signal to the LED driving control circuit 28.

The AC detection circuit 27 is coupled to an output of the AC filter circuit 21. The AC detection circuit 27 is capable of sampling the AC voltage of the AC filter circuit 21, in order to detect whether the AC filter circuit 21 is connected to an external electrical network. Then the AC detection circuit 27 outputs a corresponding connection state signal to the LED driving control circuit 28. Typically, the connection state signal indicates that the AC filter circuit 21 is connected to an external electrical network, or that the AC filter circuit 21 is not connected to an external electrical network.

The LED driving control circuit 28 receives signals from both the AC detection circuit 27 and the scaler 24, analyzes the signals, and outputs appropriate control signals to the LED driving circuit 25. Then the LED driving circuit 25 outputs voltage to turn on or turn off the LED array 26 according to the control signals from the LED driving control circuit 28.

Upon a condition that the AC filter circuit 21 is connected to an external electrical network, the AC detection circuit 27 detects the output of the AC filter circuit 21, and sends a first signal to the LED driving control circuit 28. Under the control of the first signal from the AC detection circuit 27 and the PWM signal from the scaler 24, the LED driving control circuit 28 sends a switch-on signal to the LED driving circuit 25. Then the LED driving circuit 25 outputs a high voltage to switch on the LED array 26 for illuminating the LCD panel 23.

Upon a condition that the AC filter circuit 21 is disconnected or cut off from an external electrical network, the AC detection circuit 27 detects that no AC voltage is sent out from the AC filter circuit 21. Then the AC detection circuit 27 sends a second signal to the LED driving control circuit 28. Under the control of the second signal from the AC detection circuit 27 and the PWM signal from the scaler 24, the LED driving control circuit 28 sends a switch-off signal to the LED driving circuit 25. Accordingly, the LED driving circuit 25 outputs a low voltage to switch off the LED array 26. Thus, once the LCD device 2 is cut off from the external electrical network, the backlight provided by the LED array 26 is switched off immediately without any time delay.

Figure 2:
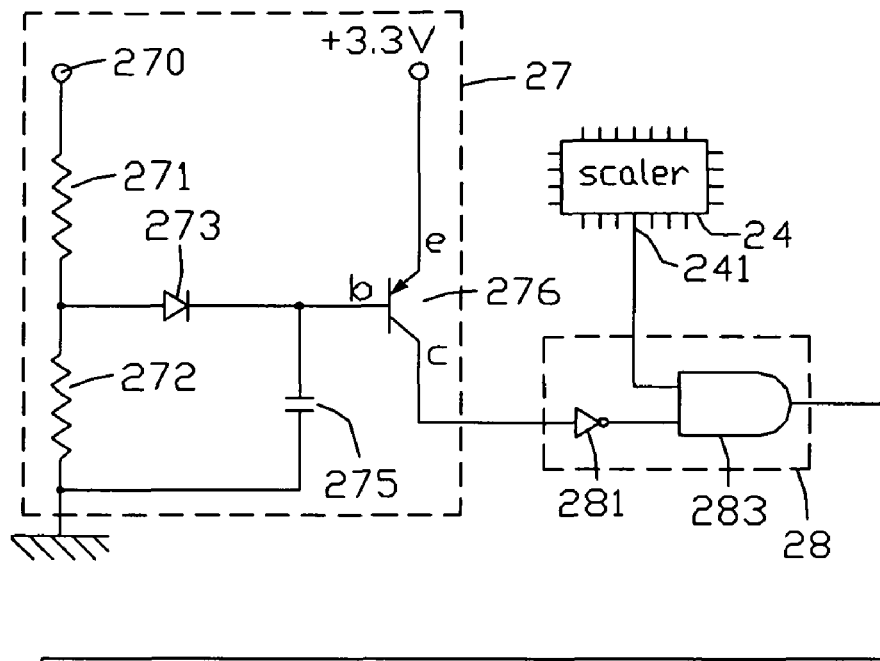
FIG. 2 is a circuit diagram of a portion of the LCD device marked by dashed lines in FIG. 1.
Figure 2:
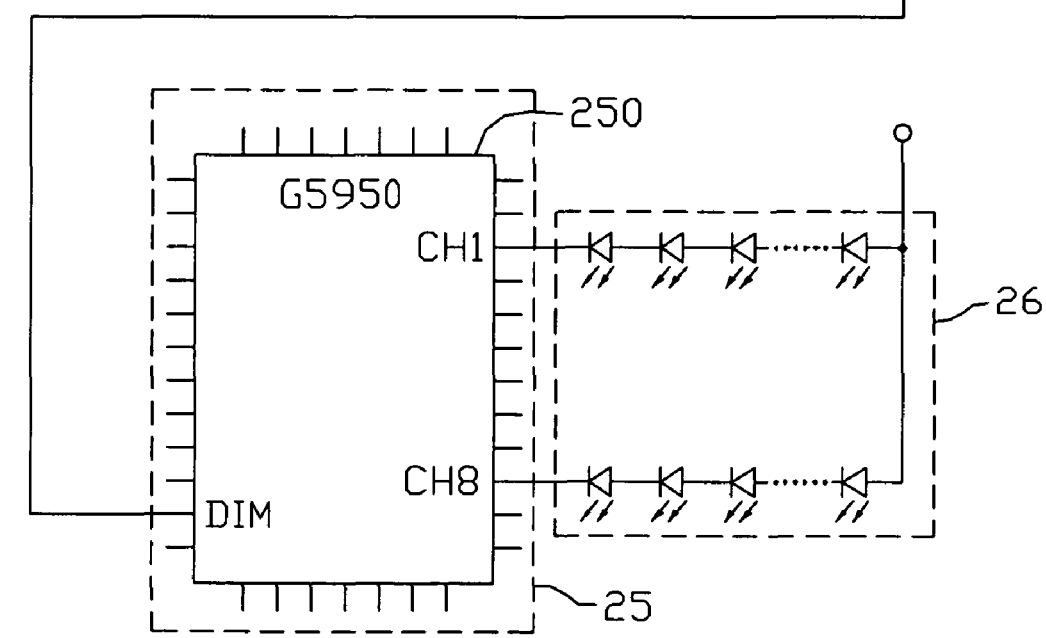
Figure 3:
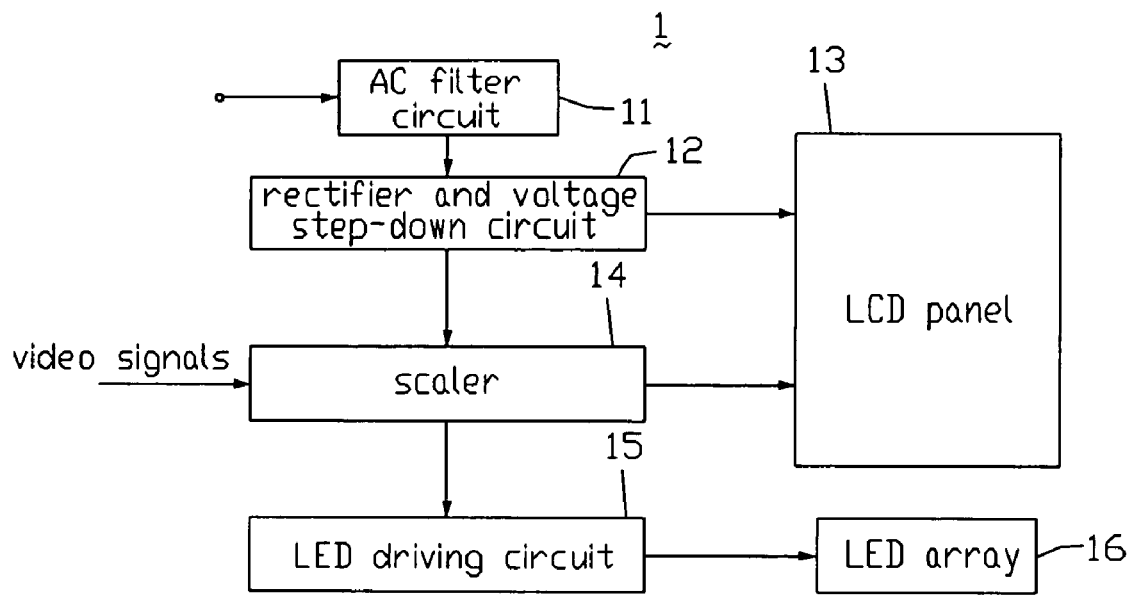
FIG. 3 is a block diagram of a conventional LCD device.

Referring to FIG. 2, this is a circuit diagram of a portion of the LCD device 2 marked by dashed lines in FIG. 1. The marked portion includes the scaler 24, the LED driving circuit 25, the LED array 26, the AC detection circuit 27, and the LED driving control circuit 28.

The AC detection circuit 27 includes an AC detection terminal 270, a first resistor 271, a second resistor 272, a diode 273, a capacitor 275, and a transistor 276. The AC detection terminal 270 is connected to the output of the AC filter circuit 21 for detecting the AC voltage. The AC detection terminal 270, the first resistor 271, and the second resistor 273 are connected in series to ground. A positive electrode of the diode 273 is connected to a node between the first resistor 271 and the second resistor 272. The capacitor 275 is connected between a negative electrode of the diode 273 and ground. The transistor 276 is a positive-negative-positive (PNP) type bipolar junction transistor, which includes a base "b", an emitter "e", and a collector "c". The base "b" is connected to the negative electrode of the diode 273. The emitter "e" is connected to a constant DC power supply, such as a 3.3 V DC power supply.

The scaler 24 includes an output pin 241 for outputting the PWM signal. The LED driving control circuit 28 includes a NOT gate 281, and an AND gate 283 with two input terminals. An input terminal of the NOT gate 281 is connected to the collector "c" of the transistor 276. An output terminal of the NOT gate 281 is connected to a first input terminal of the AND gate 283. A second input terminal of the AND gate 283 is connected to the output pin 241 of the scaler 24.

The LED driving circuit 25 includes an LED driver IC 250. The LED driver IC 250 can for example be a G5950 model, which includes a control signal input pin DIM and eight output pins CH1~CH8. The control signal input pin DIM is connected to an output of the AND gate 28. The eight output pins CH1~CH8 are connected to the LED array 26 for supplying driving voltages thereto. Upon a condition that the control signal input pin DIM receives a logic high voltage, the output pins CH1~CH8 output high voltage to switch on the LED array 26. Upon a condition that the control signal input pin DIM receives a logic low voltage, the output pins CH1~CH8 output low voltage to switch off the LED array 26.

Typical detailed operation of the LCD device 2 is as follows:

AC voltage output from the AC filter circuit 21 is sampled by the second resistor 272. The diode 273 and the capacitor 275 function as a rectifier and filter circuit, which transforms the sampling AC voltage to a sampling DC voltage. The sampling DC voltage is supplied to the base "b" of the transistor 276. Upon a condition that the AC filter circuit 21 is connected to an external electrical network, the sampling DC voltage that is applied to the base "e" of the transistor 276 is a high voltage. Thus, the transistor 276 is switched off and the collector "c" outputs a low voltage. The low voltage is converted into a high voltage by the NOT gate 281 of the LED driving control circuit 28. In this situation, the output of the AND gate 283 is determined by the PWM signal from the output pin 241. If the PWM signal is a high voltage, the output of the AND gate 283 is a high voltage. Thus, the LED driver IC 250 outputs high voltage at the output pins CH1~CH8. The LED array 26 is switched on and emits light beams. If the PWM signal is a low voltage, the output of the AND gate 283 is a low voltage. The LED driver IC 250 outputs low voltages at the output pins CH1~CH8. The LED array 26 is switched off.

Upon the other condition that the AC filter circuit 21 is cut off from an external electrical network, the sampling DC voltage that is applied to the base "e" of the transistor 276 is a low voltage. Thus, the transistor 276 is switched on and the collector "c" outputs a high voltage. The high voltage is converted into a low voltage by the NOT gate 281 of the LED driving control circuit 28. Thus no matter what kind of voltages the output pin 241 outputs, the AND gate 283 outputs a low voltage to the control signal input pin DIM. The eight output pins CH1~CH8 then output low voltages to the LED array 26. The LED array 26 is switch off.

In summary, the LCD device 2 includes the AC detection circuit 27 and the LED driving control circuit 28. The AC detection circuit 27 samples an AC signal, and detects whether the AC filter circuit 21 is connected to an external electrical network. Upon a condition that the AC filter circuit 21 is cut off or disconnected from an external electrical network, the AC detection circuit 27 sends a cut-off signal to the LED driving control circuit 28. With the cut-off signal, the LED driving control circuit 28 outputs a control signal to lower the output voltage of the LED driving circuit 25. Therefore the LED array 26 is switched off immediately. Accordingly, once the LCD device 2 is cut off from the external electrical network, the LED array 26 stops emitting light beams. This reduces or even eliminates color noise when the AC filter circuit 21 is cut off from the external electrical network, and thereby improves a display quality and aesthetic appeal of the LCD device 2.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight system, comprising:
a power input circuit;
a detection circuit;
a control circuit;
a light emitting diode driving circuit; and
a light emitting diode array;
wherein the detection circuit is configured to detect a connection state of the power input circuit with respect to an external power source, and send a corresponding connection state signal to the control circuit, the detection circuit comprises an input terminal capable of receiving voltages, a voltage sampling circuit configured for sampling voltages of the input terminal and outputting sample voltages, and a transistor having a base capable of receiving the sample voltages, an emitter capable of being connected to a constant voltage, and a collector capable of outputting detection signals, the control circuit is configured to output a control signal to the light emitting diode driving circuit according to the connection state signal, the control circuit comprises a NOT gate and an AND gate, an input terminal of the NOT gate is connected to the collector of the transistor, an output terminal of the NOT gate is connected to a first terminal of the AND gate, a second input terminal of the AND gate is capable of receiving backlight control signals from an external device, and an output terminal of the AND gate is capable of outputting the control signal to the light emitting diode driving circuit, and the light emitting diode driving circuit is configured to drive or shut down the light emitting diode array according to the control signal.

2. The backlight system of claim 1, wherein the voltage sampling circuit comprises a first resistor, a second resistor, a diode, and a capacitor, the input terminal, the first resistor, and the second resistor are connected in series and capable of being connected to ground, a positive electrode of the diode is connected to a node between the first resistor and the second resistor, and the capacitor is connected to a negative electrode of the diode and capable of being connected between the negative electrode of the diode and ground.

3. The backlight system of claim 1, wherein the light emitting diode driving circuit comprises an output control terminal capable of receiving the output control signal from the control circuit, and a plurality of output terminals capable of outputting driving voltages to drive the light emitting diode array.

4. The backlight system of claim 3, wherein the light emitting diode driving circuit is an integrated circuit.

5. The backlight system of claim 1, wherein upon a condition that the power input circuit is cut off from an external power source, the light emitting diode driving circuit stops driving the light emitting diode array.

6. A liquid crystal display device, comprising:
a power input circuit;
a detection circuit;
a control circuit;
a light emitting diode driving circuit;
a light emitting diode array;
a scaler; and
a liquid crystal display panel;
wherein the power input circuit is capable of receiving electrical power from an external power source and providing electrical power to the liquid crystal display panel and the scaler, and the scaler is configured to provide video signals to the liquid crystal display panel; and the detection circuit is configured to detect a connection state of the power input circuit with respect to an external power source, and send a corresponding connection state signal to the control circuit, the detection circuit comprises an input terminal capable of receiving voltages, a voltage sampling circuit configured for sampling voltages of the input terminal and outputting sample voltages, and a transistor having a base capable of receiving the sample voltages, an emitter capable of being connected to a constant voltage, and a collector capable of outputting detection signals, the control circuit is configured to output a control signal to the light emitting diode driving circuit according to the connection state signal, the control circuit comprises a NOT gate and an AND gate, an input terminal of the NOT gate is connected to the collector of the transistor, an output terminal of the NOT is connected to a first input terminal of the AND gate, a second input terminal of the AND gate is capable of receiving a backlight control signal from an external device, and an output terminal of the AND gate is capable of outputting the control signal to the light emitting diode driving circuit, and the light emitting diode driving circuit is configured to switch driving of the light emitting diode array according to the control signal.

7. The liquid crystal display device of claim 6, wherein upon a condition that the power input circuit is cut off from an external power source, the light emitting diode driving circuit switches off the light emitting diode array.

8. The liquid crystal display device of claim 6, wherein the voltage sampling circuit comprises a first resistor, a second resistor, a diode, and a capacitor, the input terminal, the first resistor, and the second resistor are connected in series and capable of being connected to ground, a positive electrode of the diode is connected to a node between the first resistor and the second resistor, and the capacitor is connected to a negative electrode of the diode and capable of being connected between the negative electrode of the diode and ground.

9. The liquid crystal display device of claim 6, wherein the light emitting diode driving circuit comprises an output control terminal capable of receiving the output control signal from the control circuit, and a plurality of output terminals capable of outputting driving voltages to drive the light emitting diode array.

10. A liquid crystal display device, comprising:

an alternating current filter circuit for receiving an alternating current voltage from an external electrical network and filtering surge voltages and electromagnetic interference of the external electrical network, the alternating current filter circuit comprising an output terminal for transmitting a steady alternating current voltage after filtering;

a liquid crystal panel;

an alternating current detecting circuit directly sampling the steady alternating current voltage output from the output terminal of the alternating current filter circuit to detect whether the alternating current filter circuit is connected to the external electrical network, and generating corresponding connection state signals including a first connection state signal which indicates that the alternating current filter circuit is disconnected to the external electrical network, wherein the alternating current detection circuit comprises an input terminal capable of receiving the steady alternating current voltage, a voltage sampling circuit for sampling voltages of the input terminal and outputting sample voltages, and a transistor including a base for receiving the sample voltages, an emitter connecting to a constant voltage, and a collector for selectively outputting the connection state signals to a control circuit;

an alternating current rectifier and voltage step-down circuit for transforming the alternating current voltage to a plurality of direct current voltages;

a backlight system capable of receiving the connection state signals and then selectively stopping providing light beams to the liquid crystal panel according to the received connection state signals, wherein when the first connection state signal is applied to the backlight system, the backlight system stops providing the light beams to illuminate the liquid crystal panel, wherein the backlight system comprises the control circuit, a light emitting diode driving circuit and a light emitting diode array, the control circuit is capable of receiving the connection state signals and further correspondingly generating a control signal to the light emitting diode driving circuit according to the received connection state signals, and the light emitting diode driving circuit is capable of driving or shutting down the light emitting diode array according to the control signal; and a scaler capable of providing a plurality of video signals to the liquid crystal panel, wherein the scaler receives a corresponding direct current voltage output from the alternating current rectifier and voltage step-down circuit and outputs a pulse width modulation signal to the backlight system;

wherein the control circuit comprises a NOT gate and an AND gate, an input terminal of the NOT gate is connected to the collector of the transistor, an output terminal of the NOT gate is connected to a first input terminal of the AND gate, a second input terminal of the AND gate is capable of receiving the pulse width modulation signal output from the scaler, and an output terminal of the AND gate is capable of outputting the control signal to the light emitting diode driving circuit.

11. The liquid crystal display device of claim 10, wherein the correction state signals further comprise a second connection state signal which indicates that the alternating current detecting circuit detects that the alternating current filter circuit is connected to the external electrical network.

12. The liquid crystal display device of claim 11, wherein when the backlight system receives the second connection state signal, the backlight system detects the pulse width modulation signal and further provides or stops providing the light beams to illuminate the liquid crystal panel under control of the received pulse width modulation signal.

13. The liquid crystal display device of claim 12, wherein when the backlight system receives the second connection state signal and the received pulse width modulation signal is high, the backlight system provides the light beams to illuminate the liquid crystal panel.

14. The liquid crystal display device of claim 12, wherein when the backlight system receives the second connection state signal and the received pulse width modulation signal is low, the backlight system stops providing the light beams to illuminate the liquid crystal panel.

* * * * *